Jan. 25, 1966  R. R. VAN NIMWEGEN ETAL  3,230,710
GAS TURBINE
Filed Dec. 24, 1962  4 Sheets-Sheet 1

INVENTORS
ROBERT R. VAN NIMWEGEN
MONTGOMERIE C. STEELE
CURTIS E. BRADLEY

*Herschel C. Omohundro*
ATTORNEY

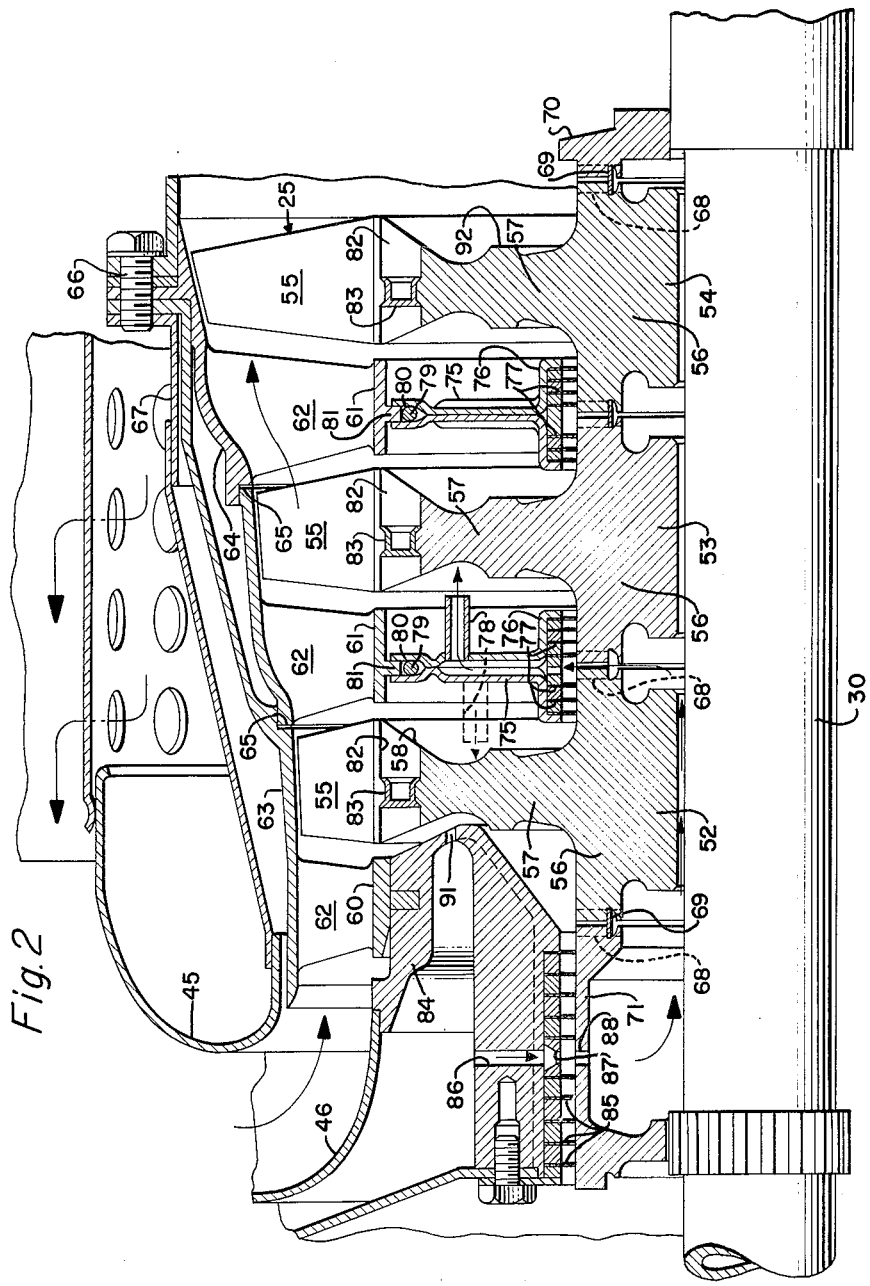

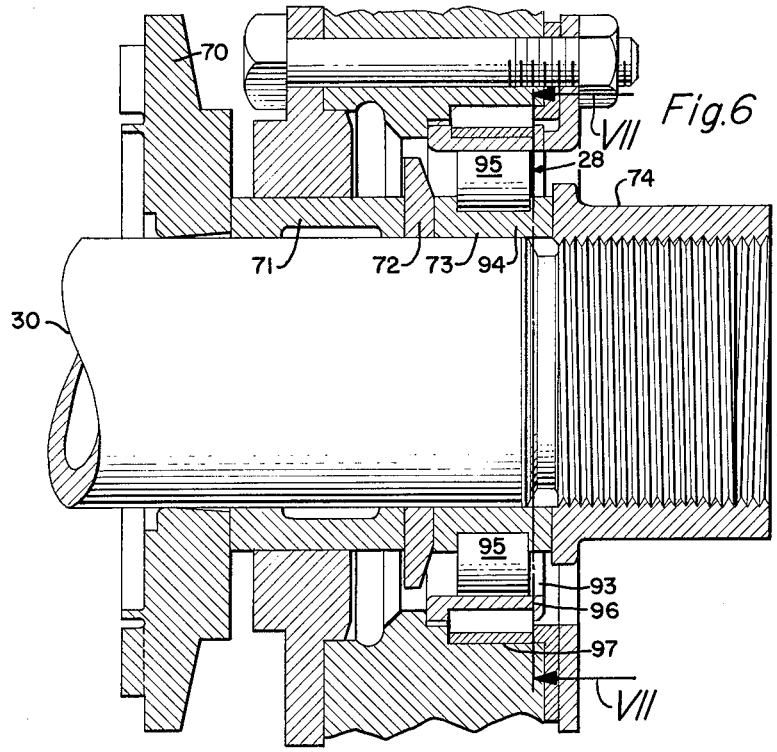
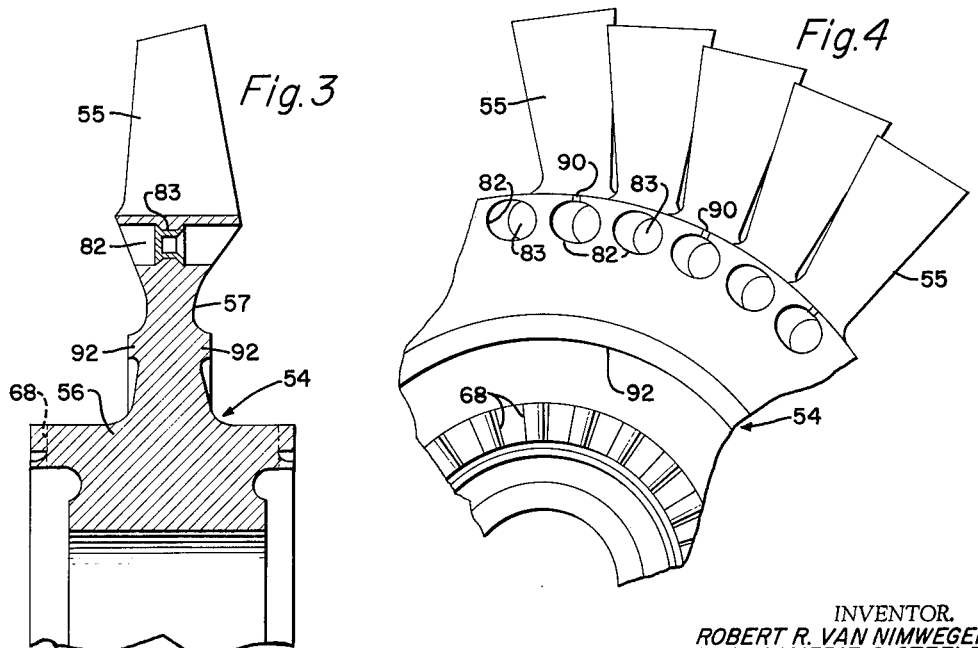

Jan. 25, 1966  R. R. VAN NIMWEGEN ETAL  3,230,710

GAS TURBINE

Filed Dec. 24, 1962  4 Sheets-Sheet 4

INVENTORS
ROBERT R. VAN NIMWEGEN
MONTGOMERIE C. STEELE
CURTIS E. BRADLEY

Herschel C. Omohundro
ATTORNEY

United States Patent Office 3,230,710
Patented Jan. 25, 1966

3,230,710
GAS TURBINE
Robert R. Van Nimwegen, Montgomerie C. Steele, and Curtis E. Bradley, Phoenix, Ariz., assignors to The Garrett Corporation, Los Angeles, Calif., a corporation of California
Filed Dec. 24, 1962, Ser. No. 246,687
15 Claims. (Cl. 60—39.66)

This invention relates generally to engines and more particularly to gas turbine engines of the type having an air compressor, a combustor in which the compressed air is supplied with fuel and burned, and a turbine powered by the resulting gases of combustion and connected with the compressor to effect operation thereof.

Heretofore, engines of the above-mentioned type have been complicated and expensive to construct and maintain. They have also been open to the objection that parts frequently fail due to high stresses resulting from wide differences in expansion and contraction, particularly during the transient phases of operation.

An object of this invention is to provide a gas turbine engine construction which will eliminate or overcome the objections of prior engines.

Another object of this invention is to provide a gas turbine engine having a novel turbine wheel construction and means for applying a cooling fluid thereto which will decrease the tendency of the wheel to fail because of stresses resulting from rapid, unequal, or localized expansion.

Still another object of the invention is to provide a gas turbine engine having a turbine section composed of a plurality of wheels providing successive stages and separator and nozzle assemblies between adjoining wheels, the wheels and separator and nozzle assemblies having rim and ring members, respectively, which cooperate to provide part of the combustion gas passage, the rims being so constructed as to counteract compressive stress resulting from relatively sudden increases of temperature occurring during transient phases of operation such as in starting or in changes in loading.

A further object of the invention is to provide a gas turbine engine having a turbine section composed of a plurality of wheels with separator and guide nozzle assemblies therebetween, each wheel being an integral structure having a disk body which is flared adjacent the periphery to provide a rim from which spaced blades project, the flared portion of the body having holes extending through it just inside the rim, the latter being transversely slotted at predetermined points to divide it into segments which may expand and contract without introducing excessive stresses into the wheel, the separator portions of the guide nozzle assemblies having passages for receiving cooling fluid and jet nozzles for directing such fluid against the wheel bodies adjacent the rim to remove heat therefrom and reduce the temperature differential between the outer and inner portions of the wheels.

It is a still further object of the invention to provide a gas turbine engine having a turbine section composed of a plurality of wheels with disk bodies flared at the peripheral portions to provide rims from which spaced blades project in a radial direction, the rims being of substantially equal diameter, separator and guide nozzle assemblies being disposed between the wheels and having ring portions of a diameter similar to the rim diameters and cooperating with the rims to form part of the gas passage, the rims being interrupted at predetermined intervals to provide segments which may separately expand and contract without introducing undue stress into the wheels.

Another object is to provide a gas turbine engine having a turbine section composed of a plurality of one-piece wheels having intercoupled hub portions and disk bodies projecting from the hub portions, the disk bodies flaring adjacent the peripheries to form widened rims from which spaced blades project, the rims cooperating with inner rings of nozzle blade structure to form part of the combustion gas passage, the nozzle blade structure also having outer rings forming another part of the gas passage and guide blades connecting the inner and outer rings, the rings being constructed in such a manner as to more uniformly direct the gas flow to the turbine wheel blades.

An object also is to provide a gas turbine engine having a turbine section composed of a plurality of one-piece wheels having intercoupled hub portions which provide parts of cooling air passages, disk bodies projecting outwardly from the hub portions and flaring adjacent their peripheries to form rims, the latter being provided with a series of openings which register with spaces between blades projecting from the rims to form relatively reduced blade roots, separator partitions being provided between adjacent wheels and having cooling fluid passages formed therein, the passages communicating with jet outlet tubes carried by the partitions and serving to direct cooling fluid, supplied to a passage formed by the hubs and flowing through the couplings therebetween and into the passages in the partitions, against the wheel rims to remove heat therefrom.

Other objects and advantages will be apparent from the following description of a gas turbine engine embodying the present invention, the engine being illustrated in detail in the accompanying drawings.

In the drawings:

FIG. 2 is a fragmentary longitudinal sectional view on an enlarged scale through the turbine portion of the engine shown in FIG. 1;

FIG. 3 is a detail axial sectional view taken through a portion of a wheel forming one stage of the turbine shown in FIG. 2;

FIG. 4 is a fragmentary front elevational view of the wheel shown in FIG. 3;

FIG. 6 is an enlarged fragmentary axial sectional view taken through the mounting for the turbine shaft on the plane indicated by the line VI—VI of FIG. 1.

Figure 1:
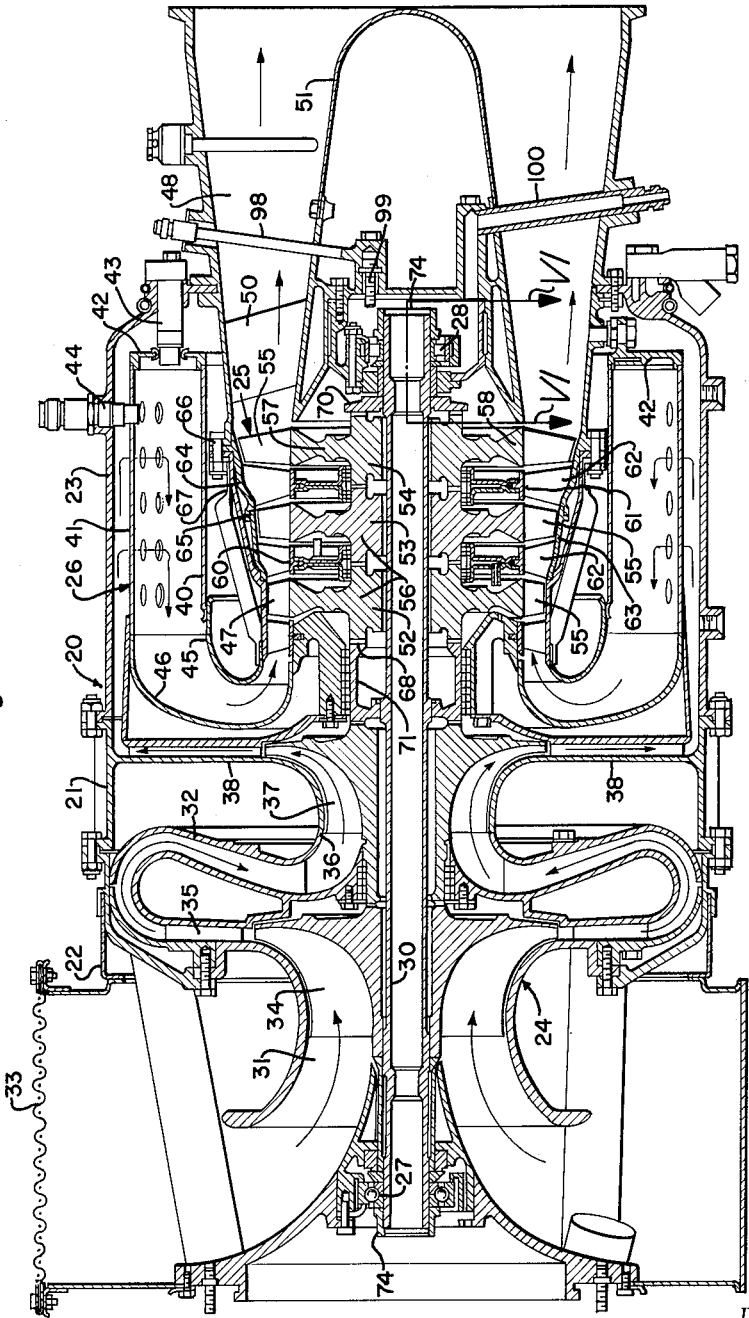
FIG. 1 is a vertical longitudinal sectional view through a gas turbine engine embodying the present invention.

Referring more particularly to the drawing and especially to FIG. 1, the gas turbine engine is designated generally by the numeral 20. The invention is directed more particularly to the turbine section of the engine, but a general description of the entire engine will be given to facilitate a better understanding of the invention.

The engine 20 is composed of a casing portion and a rotating portion. The casing, in the embodiment of the engine illustrated, includes a plurality of pieces 21, 22 and 23 assembled into the complete casing. The rotating assembly is also fabricated from a number of pieces to form a compressor section designated generally by the numeral 24 and a turbine section designated by the numeral 25. The pieces 21 and 22 of the casing house the compressor section of the rotating assembly, while the piece 23 houses the turbine portion of the rotating assembly. A combustor 26 is also housed in the portion 23.

To support the rotating assembly, the housing is provided with front and rear bearings 27 and 28, respectively, these bearings receiving the end portions of a tubular shaft 30 which forms a part of the rotating assembly, the pieces composing the compressor and turbine being stacked on and fixed to the shaft. The compressor portion includes other pieces which are assembled to form inlet and crossover duct assemblies designated by the numerals 31 and 32, the former including a bellmouth disposed within the casing portion 22 which is provided with an enlarged screened opening 33 to admit air to the compressor. The compressor, in the form of the invention illustrated, is a two-stage centrifugal type compressor, the first stage 34 of the compressor rotor being disposed within the inlet duct to receive air drawn into the bellmouth and discharge such air into the crossover duct 32. As is customary in compressors of this type, the crossover ducts contain diffusing vanes 35 adjacent the discharge or outlet portion of the compressor rotor 34. The crossover duct is of a reversely curved configuration and terminates as at 36 at the inlet of the second stage 37 of the compressor rotor. The outlet of this stage of the rotor discharges into another diffuser duct 38 which radiates to the outer portion of the casing and discharges auxially into a plenum formed by the portion 23 of the casing. Due to the passage of the air through the successive stages and diffusers of the compressor, the pressure and density of the air will be increased. This compressed air is then mixed with fuel and burned to provide heated gases for the operation of the turbine.

To effect the mixture of the compressed air with fuel and the burning of such mixture, the combustor 26 has been provided. In the form of the invention illustrated, the combustor is of annular shape and surrounds the turbine section of the rotating assembly. The combustor includes concentric inner and outer walls 40 and 41, respectively, which are provided with air inlet openings in the customary manner. The space between the rear ends of the inner and outer walls is closed by an end wall 42 through which fuel nozzles 43 project, these nozzles being suitably supported in the casing section 23. Fuel is supplied to these nozzles and is sprayed thereby into the space between the walls 40 and 41, the fuel being mixed with compressed air flowing into the space through the openings in the walls 40 and 41. Suitable ignition means 44 is also supported by the casing 23 with one end of the ignition means projecting into the space between the concentric combustor walls. When the operation of the engine is to be initiated, the igniter 44 is energized to cause the fuel and air mixture to burn. After this ignition has continued for a required period of time, the combustion will become self-sustaining. The combustor also includes curved inner and outer walls 45 and 46 which constitute continuations of the walls 40 and 41, respectively, and form a transition portion which converges and turns 180° to connect the combustor with the inlet end of an annular combustor gas passage 47. This passage contains gas directing nozzle vanes to properly direct the gases of combustion against the turbine wheels to effect rotation of the turbine. This movement will be transmitted by the shaft 30 to the compressor rotors to effect the operation of the compressor. The turbine gas passage 47 diverges toward the rear end of the engine and connects with an exhaust passage 48 which is formed of suitably shaped pieces. One or more struts 50 extend from the outer wall of the exhaust passage to an inner cone 51 which forms the inner wall of the exhaust passage. These struts 50 also assist in the support of the rear bearing 28.

As previously mentioned, the present invention is directed more particularly to the turbine portion of the engine. This portion is shown more in detail in FIG. 2 and includes a plurality of wheels 52, 53 and 54 which form successive stages of the turbine. This turbine is of the axial flow type, each wheel having blades 55 disposed in the gas passage 47 for impingement by the air and fuel mixture, the energy of which has been raised to effect the rotation of the turbine. Each wheel includes a hub portion 56 from which a disk-type body 57 radiates in a plane normal to the shaft 30. In one form of the invention, this disk body tapers in cross section from the hub outwardly. The disk body is flared adjacent its periphery as at 58 to form an annular rim, the blades 55 projecting substantially radially from this rim. Wheels 52, 53 and 54 are of substantially equal diameter at their rim portions, such rim portions forming parts of the inner wall of the gas passage 47. This particular wall is completed by rings 60 and 61 forming parts of stator or nozzle and turbine spacer assemblies. The rings 60 and 61 have curved gas guide or nozzle vanes 62 projecting substantially radially therefrom, the outer end portions of these vanes being connected with ring sections 63 and 64 which combine to form the outer wall of the gas passage 47. Sections 63 and 64 are interfitting as at 65 to confine the gases in the passage 47. They are suitably supported in connection with the casing section 23. In the particular illustration, the pieces 63 and 64 are flanged and are connected with a similar flange on a part of the exhaust passage wall by bolts 66. The latter flange also assists in supporting the combustor transition portion, as illustrated at 67.

Figure 5:
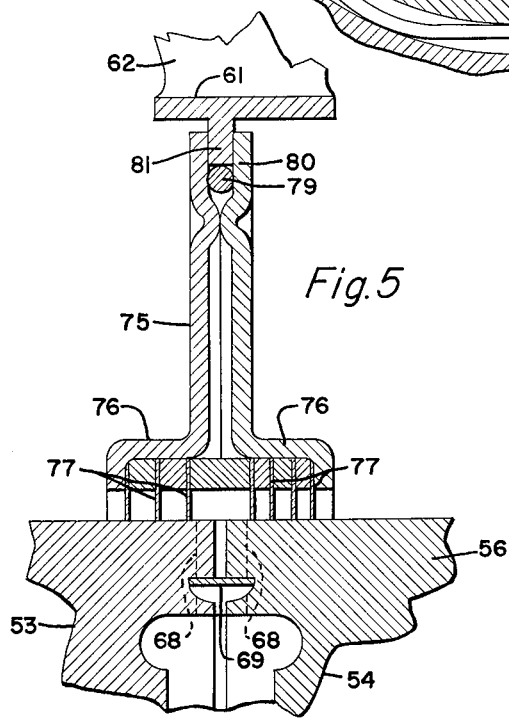
FIG. 5 is an enlarged detail sectional view taken through portions of a partition separating two stages of the turbine.

Turbine wheels 52, 53 and 54 are coupled to one another by providing the ends of the hub portions with lugs 68 spaced by recesses, the lugs being precisely formed to interfit the recesses on the adjoining hub. This type of coupling is known in the trade as a "curvic" coupling. As illustrated in FIGS. 2 and 5, the hub portions of the wheels and spacers provided with the curvic couplings are provided at the inner edges of the couplings with recesses to receive ribbonlike elements 69 which seal the spaces between the complemental coupling teeth and prevent loss of cooling fluid therethrough. These seal elements are omitted from couplings through which air flow is desired, as will be explained later. It is also used between the hubs of the end wheels on the turbine and spacer rings 70 and 71, the latter being disposed between the turbine section of the rotating assembly and the second stage of the compressor section of such assembly. The different stages of the compressor section are similarly coupled to one another so that the entire rotating assembly will revolve as a unit. The various pieces comprising the rotating assembly are retained in their coupled relationship by providing the seal and spacer 71, oil slinger 72, and bearing race elements 73 on the tubular shaft 30 and clamping these elements in assembled relation by nuts 74 threaded on the ends of the shaft.

As shown in FIG. 2, the rings 61 form parts of combined separator and stator or nozzle assemblies disposed between the successive stages of the turbine. These assemblies also include partition walls 75 which separate the various stages of the turbine from one another, that is, they prevent the flow of operating fluid from one stage to another except through the nozzle portions. Each separator partition is formed from a pair of oppositely arranged annular stampings secured together to form the partition. The inner edges of the stampings terminate in flanges 76 which are shaped to receive and hold seal elements 77. The partition forming stampings are also formed with radially directed grooves which cooperate when the stampings are disposed in face-to-face relationship to form cooling fluid passages, these terminating in spaced relation from the peripheries of the partitions and in certain instances communicating with jet outlet tubes 78, the purpose of which will be set forth hereinafter. The peripheral portions of the stampings are spaced as at 80 to provide an annular channel for the reception of a tongue 81 projecting inwardly from the ring 61. It will be obvious that this ring and groove arrangement will permit the partition walls to move relative to the ring 61 without sacrificing the gas confining properties thereof. This relative movement may be due to slight discrepancies in the various parts and to expansion or contraction resulting from the differential heating and cooling of the parts. The separator partitions are retained in concentric relationship with the stator and rotating assemblies by disposing centering springs 79 in spaces 80 at the inner edges of the tongues 81. As the rings 61 expand and contract, the springs 79 do likewise and hold the partitions in concentric relationship with the wheel hubs.

One of the features of the invention pointed out previously is to protect the parts of the turbine against stress due to suddent or unequal heating and cooling during operation of the engine. This feature is accomplished by providing each wheel with a series of openings 82 immediately inside the periphery of the rim. These openings may be drilled or otherwise formed and extend completely through the wheel. The axes of these openings are disposed in radially inward registration with the means centers of the gas passages provided by spacing the turbine blades and twisting the latter to provide reaction surfaces against which the gases of combustion will impinge. In forming the openings 82, each end thereof is counterbored, thus providing shoulders adjacent the center planes of the wheels. The openings are closed against fluid flow therethrough by disposing hollow rivets 83 therein and upsetting such rivets to secure them in place. It should be obvious that other means could be provided to preclude the flow of fluid through the openings.

The formation of the openings 82 provide the blades 55 with relatively narrow root sections to reduce heat conduction from the blades to the wheel proper. This conduction of heat is further prevented by directing cooling fluid through the jet outlet tubes 78 against the wheels to remove heat therefrom. As shown in FIG. 2, these tubes are extended toward the thinner portion of the wheel body substantially at the juncture of the flaring and tapered portions. It will be obvious that as cooling fluid strikes the wheel, heat will be removed therefrom and conducted by the fluid outwardly through the spaces between the wheel rims and the nozzle rings to the gas passage 47. The wheel hubs will thus be operated at a substantially lower temperature during the steady state phase of the engine operation and therefore not subject to stress rupture failure of the turbine disk.

It will be observed from FIG. 2 that a portion 84 of the engine housing or frame connects with the curved transition section 46 of the combustor and extends inwardly toward the spacer 71 on the rotating assembly. This portion 84 of the frame supports a seal 85 which engages the spacer 71 and closes the space around this spacer to the passage of air or other fluid. The portion 84 also forms a part of a cooling fluid passage through which compressed air from the plenum may flow to one or more, if desired, of the passages in the partitions 75. This passage consists in ports 86 formed in the part 84, registering ports 87 formed in seal 85, and ports 88 which communicate in certain positions of rotation of the spacer 71, with the ports 87. Spacer 71 and the hubs of the wheels form part of the cooling fluid passage as do also spaces formed in one or more of the curvic couplings, the latter registering with openings formed in seals 77, these openings communicating with the passages in the partitions. It will be obvious that as compressed air flows through ports 86, 87 and 88 and through the inner portions of the hubs, the latter will be partially cooled. This air will continue to flow between the parts of the curvic couplings and through the passages in the partitions, through the outlet tubes 78 and be directed against the disk bodies of the wheels. Some of the fluid will also flow between the parts of the seal and along the outer sides of the disk bodies to conduct heat therefrom. The part 84 of the turbine frame may also be provided with openings 91 to direct compressed air against the forward face of the first stage turbine wheel. In the particular turbine selected for illustration, provisions are made for cooling the wheel of the first stage on both sides and the wheel of the second stage on one side only. As a part of this plan, the ribbon seal is omitted from the curvic coupling between the second and third wheel hubs. It should be obvious that the cooling provisions can be varied to suit the requirements.

As previously mentioned, prior turbine wheels were open to the objection of deterioration due to cracking or other distortion resulting from overheating. To counteract this tendency and to relieve compressive stress due to rapid or uneven heating, the rims of the wheels are transversely slotted at predetermined points, as shown in FIG. 4 at 90. These slots extend parallel to the axes of the adjacent openings 82 and connect with such openings. When the operation of the turbine is initiated, the relatively hot gases from the combustor will engage the relatively cool turbine blades and impart heat thereto. Some of this heat will tend to flow through the wheel rims to the wheel disks. Because of the mass distribution of the wheel which has its large mass at the hub, the heat flux from the rim to the hub during sudden change in turbine gas temperature causes a large thermal and stress gradient within the wheel during transient temperature status. These gradients are effectively controlled by the design as shown. Due to the application of cooling fluid, however, this conducted heat will be maintained at a desired minimum.

It will be noted from FIG. 2 that the partition 75 between the first and second stages of the turbine has jet outlet tubes 78 projecting from both sides. This arrangement is provided so that the wheel of the first stage will have cooling fluid directed against both sides thereof, the forward side receiving fluid from ports 91 in portion 84 of the frame and the rear side receiving air from outlet tubes 78. The second stage wheel receives air on the forward side only from tubes 78. The partition 75 between the second and third stages does not have the outlet tubes 78 in the form of the invention shown, since sufficient heat will have been removed from the gases prior to the time they reach the downstream side of the second stage. It should be obvious, of course, that if excessive heat remains in the gases, jet outlet tubes could also be provided on the partition between the second and third or other successive stages if such are provided. With the cooling fluid arrangement illustrated, the first stage is cooled around the hub, along the sides of the body, and has cooling fluid directed against both sides of the thinnest part of the body. The second stage is cooled around the hub and along the front side of the body and has cooling fluid against one side only of the thinnest portion of the body. The third stage is not cooled except for the heat extracted by the bearing through the lubrication thereof.

From the foregoing it will be apparent that means have been provided for supplying a greater amount of cooling fluid to the first stage and proportionally lesser amounts to the succeeding stage.

The bodies of the wheels have been illustrated as including annular rings 92 disposed a predetermined distance from the rotational axes. These rings provide surfaces from which some of the material of the wheels may be removed during the balancing of the wheels. It should be apparent that the wheels are of substantially the same diameter, the different stages being provided by terminating the lengths of the blades at different distances from the rims. This feature assists in reducing the cost of manufacturing the engine.

Figure 7:
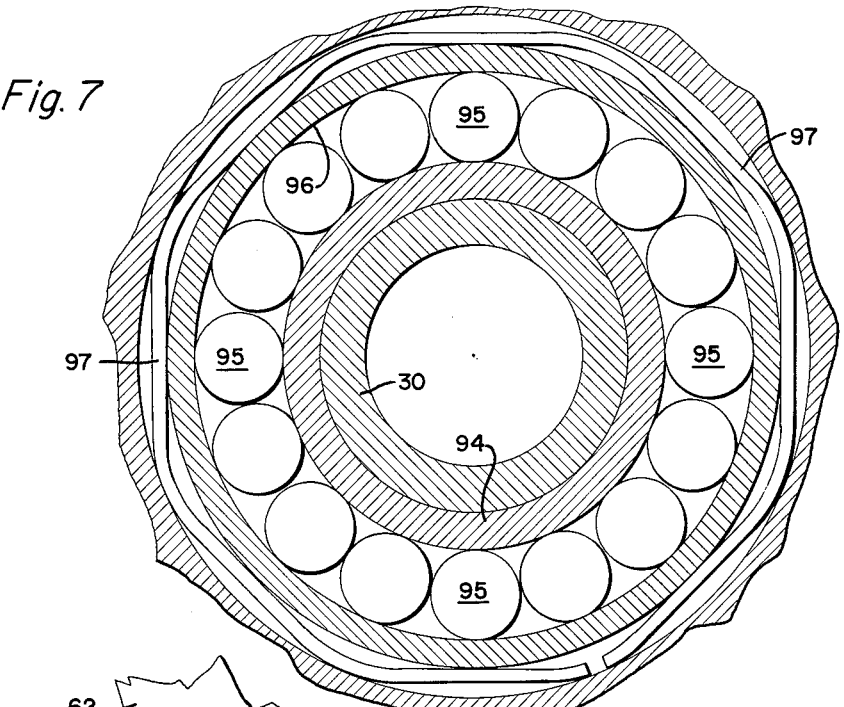
FIG. 7 is a detail transverse sectional view taken on the plane indicated by the line VII—VII of FIG. 6.

FIGS. 6 and 7 show the rear mounting of the rotating assembly. This mounting includes a resiliently mounted bearing 93 which is carried by the frame and provides a relatively flexible support for the rotating assembly, a similarly mounted bearing being employed at the forward end of the shaft. This bearing includes an inner race 94, a plurality of rollers 95, an outer race 96, and resilient means 97 for supporting the outer race in the frame. This bearing is lubricated by directing oil or other suitable fluid through a tube 98 which extends transversely of the exhaust passage 48 and terminates in a nozzle 99 projecting toward the bearing. This fluid is removed through an outlet tube 100 which communicates with the lower end of the chamber in which the bearing is disposed. The latter tube also extends transversely across the exhaust passage 48. The fluid may be recirculated through a suitable system (not shown).

We claim:

1. In a gas turbine engine:
(a) a one-piece turbine wheel having a hub portion;
(b) a generally outwardly tapering disk body projecting radially from said hub portion, the periphery of said body being flared to form a rim;
(c) a plurality of circumferentially spaced blades projecting radially from said rim for impingement by gases at high temperature from a combustor to effect turbine operation, said body having a circular row of openings extending through the flared portion immediately inside said rim, the latter being interrupted at predetermined intervals by slots extending into certain openings; and
(d) means for conducting compressed air from a source thereof and directing it against the body of said wheel adjacent the juncture of said tapering and flared portions to reduce the flow of heat through said body toward said hub.

2. In a gas turbine engine:
(a) a plurality of wheels forming successive turbine stages, each wheel having a hub portion;
(b) a generally outwardly tapering disk body projecting radially from each of said hub portions, the periphery of said body being flared to form a rim;
(c) a plurality of circumferentially spaced blades projecting radially from said rim for impingement by gases at high temperature from a combustor to effect turbine operation, said body having a circular row of openings extending through the flared portion immediately inside said rim, the latter being interrupted at predetermined intervals by slots extending through the trim into certain openings; and
(d) means for conducting compressed air from a source thereof and directing it against the bodies of predetermined wheels adjacent the juncture of said tapering and flared portions to reduce the flow of heat through said bodies toward said hubs, said air directing means being arranged to apply most air to the wheel of the first stage and decreasing amounts of air to the wheels of the succeeding stages.

3. In a gas turbine engine:
(a) a plurality of wheels forming successive turbine stages;
(b) a separator and nozzle assembly between adjacent wheels, each wheel having a hub portion;
(c) a generally outwardly tapering disk body projecting radially from said hub portion, the periphery of said body being flared to form a rim;
(d) a plurality of circumferentially spaced blades projecting radially from said rim for impingement by gases at high temperature from a combustor to effect turbine operation, said body having a circular row of openings extending through the flared portion immediately inside said rim, the latter being interrupted at predetermined intervals by slots extending through the rim into adjacent openings;
(e) fluid passages formed in said separator and nozzle assemblies;
(f) jet outlets carried by said separator and nozzle assemblies;
(g) means for conducting compressed air from a source thereof to the fluid passages in said separator and nozzle assemblies, such air being directed toward certain of the disk bodies at the junctures of the tapering and flared portions to reduce the flow of heat through said bodies toward said hubs; and
(h) a gas flow confining ring on each of said separator and nozzle assemblies, said rings being in axial registration with the rims of said wheels.

4. In a gas turbine engine:
(a) a plurality of wheels forming successive turbine stages;
(b) a separator and nozzle assembly between adjacent wheels, each wheel having a hub portion;
(c) a generally outwardly tapering disk body projecting radially from each of said hub portions, the periphery of said body being flared to form a rim;
(d) a plurality of circumferentially spaced blades projecting radially from said rim for impingement by gases at high temperature from the combustor to effect turbine operation, said body having a circular row of openings extending through the flared portion immediately inside said rim, the latter being interrupted at predetermined intervals by slots extending through the rim into adjacent openings;
(e) fluid passages formed in said separator and nozzle assemblies;
(f) jet outlets carried by said separator and nozzle assemblies;
(g) means for directing compressed air from a source thereof around the hub portions of certain of said wheels to the fluid passages in said separator and nozzle assemblies, such air being directed toward predetermined disk bodies at the junctures of the tapering and flared portions to remove heat from the flared portions; and
(h) a gas flow confining ring on each of said separator and nozzle assemblies, said rings being substantially equal in diameter to and cooperating with adjacent wheel rims to form part of gas flow passages.

5. In a gas turbine engine:
(a) a plurality of wheels forming successive turbine stages;
(b) a separator and nozzle assembly between adjacent wheels, each wheel having a hub portion, the hub portions of adjacent wheels being coupled to one another with interfitting lugs and recesses which permit fluid flow therebetween;
(c) a disk body projecting radially from each of said hub portions, said disk body being flared adjacent the periphery to form a rim;
(d) a plurality of circumferentially spaced blades projecting radially from said rim for impingement by high temperature gases from a combustor to effect turbine operation, said body having a circular row of openings extending through the flared portion just inside said rim, the latter being interrupted at predetermined intervals by slots extending through the rim into adjacent openings;
(e) seal means carried by said separator and nozzle assemblies and engaging said hubs at the couplings therebetween;
(f) fluid passages formed in said separator and nozzle assemblies and in said seal means;
(g) jet outlets carried by said separator and nozzle assemblies in communication with said fluid passages;
(h) means for conducting compressed air from a source thereof to the interiors of the hub portions of said wheels, such air flowing through said fluid passages and being directed toward areas of predetermined disk bodies immediately inside said circular row of openings to remove heat from said rims; and
(i) a gas flow confining ring on each of said separator and nozzle assemblies, said rings being substantially equal in diameter to and cooperating with adjacent wheel rims to form part of gas flow passage.

6. In a gas turbine engine:
(a) a plurality of wheels forming successive turbine stages;
(b) a separator and nozzle assembly between adjacent wheels, each wheel having a hub portion, the hub portions of adjacent wheels being coupled to one another with interfitting lugs and recesses which permit fluid flow therebetween;
(c) a disk body projecting radially from each of said hub portions, said disk body being flared adjacent the periphery to form a rim;
(d) a plurality of circumferentially spaced blades projecting radially from said rim for impingement by high temperature gases from a combustor to effect turbine operation, the rims of all wheels being substantially equal in diameter, the radial length of the blades on successive stages progressively increasing, each of said bodies having a circular row of openings extending through the flared portion just inside said rim, each opening substantially registering in a radial direction with a space between adjacent blades, said rims being interrupted at predetermined intervals by slots extending through the rim from spaces between adjacent blades into adjacent openings;
(e) fluid passages formed in certain of said separator and nozzle assemblies;
(f) jet outlets carried by predetermined separator and nozzle assemblies in communication with said fluid passages;
(g) means for directing compressed air from a source thereof to the fluid passages in said separator and nozzle assemblies, such air being directed toward areas of predetermined disk bodies immediately inside said circular row of openings to remove heat from said rims; and
(h) a gas flow confining ring on each of said separator and nozzle assemblies, said rings being substantially equal in diameter to and cooperating with adjacent wheel rims to form part of gas flow passage.

7. A one-piece turbine wheel, comprising:
(a) a hub;
(b) a disk-type body projecting radially from said hub, the peripheral portion of said body being flared to form a rim;
(c) a plurality of circumferentially spaced blades projecting radially from said rim, said body having a circular row of openings extending therethrough immediately inside the periphery of said rim, each opening being in radial registration with a space between adjacent blades and counterbored from opposite sides of said body; and
(d) a substantially hollow plug disposed in each opening and expanded into tight engagement with said body, said plug having a closed end to prevent fluid flow through said opening during operation of said wheel.

8. A one-piece turbine wheel, comprising:
(a) a hub;
(b) a disk-type body projecting radially from said hub, the peripheral portion of said body being flared to form a rim;
(c) a plurality of circumferentially spaced blades projecting radially from said rim, said body having a circular row of openings extending through the flared portion immediately inside the periphery of said rim, each opening being in radial registration with a space between adjacent blades and counterbored from opposite sides of said body to a point adjacent the center plane of said body; and
(d) a substantially hollow plug disposed in each opening and expanded into tight engagement with said body, the rim of said body being slotted from the periphery into predetermined openings.

9. A rotary turbine wheel comprising:
(a) a hub;
(b) a disk-type body integrally formed on said hub and projecting radially therefrom, the peripheral portion of said body being flared to form a rim;
(c) a plurality of blades integrally formed with said body and projecting radially from said rim, said blades being circumferentially spaced and twisted to provide a curved passage between adjacent blades extending generally axially and angularly relative to the axis of rotation of the wheel, said body having a circular row of openings extending through the flared portion immediately inside the rim, each opening being in radial registration with a space between adjacent blades, the axis of such opening being substantially parallel with the mean angle of the passage formed by the spacing and twist of the blades; and
(d) a plug secured in each opening.

10. A rotary turbine wheel, comprising:
(a) a hub;
(b) a disk-type body integrally formed on said hub and projecting radially therefrom, the peripheral portion of said body being flared to form a rim;
(c) a plurality of blades integrally formed with said body and projecting radially from said rim, said blades being circumferentially spaced and twisted to provide a curved passage between adjacent blades extending generally axially and angularly relative to the axis of rotation of the wheel, said body having a circular row of openings extending through the flared portion immediately inside the rim, each opening being in radial registration with a space between adjacent blades, the axis of such opening being substantially parallel with the mean angle of the passage formed by the spacing and twist of the blades, each opening being counterbored from opposite sides of said body; and
(d) a plug secured in each opening.

11. A rotary turbine wheel, comprising:
(a) a hub;
(b) a disk-type body integrally formed on said hub and projecting radially therefrom, the peripheral portion of said body being flared to form a rim;
(c) a plurality of blades integrally formed with said body and projecting radially from said rim, said blades being circumferentially spaced and twisted to provide a curved passage between adjacent blades extending generally axially and angularly relative to the axis of rotation of the wheel, said body having a circular row of openings extending through the flared portion immediately inside the rim, each opening being in radial registration with a space between adjacent blades, the axis of such opening being substantially parallel with the mean angle of the passage formed by the spacing and twist of the blades, each opening being counterbored from opposite sides of said body to a point adjacent the center plane of said body;
(d) a hollow rivet disposed in each opening and expanded into tight engagement with said body; and
(e) a narrow groove extending across the rim of said body at the inner end of predetermined passages, said groove opening into the registering opening.

12. A one-piece turbine wheel, comprising:
(a) a hub portion;
(b) a disk-type body projecting radially from said hub portion, said body tapering in cross section generally outwardly and terminating in a flared rim;
(c) a plurality of circumferentially spaced blades projecting radially from said rim, said blades being twisted and curved to provide passages between adjacent blades extending generally axially and angularly relative to the axis of rotation of the wheel, said body having a circular row of openings extending through the flared portion immediately inside the outer surface of the rim, the axis of each opening being in radial registration with and extending generally parallel to a passage between two adjacent blades, said rim being interrupted at predetermined intervals by slots extending into adjacent openings; and
(d) means for closing said openings to prevent fluid flow therethrough.

13. In a gas turbine engine:
(a) a plurality of wheels forming successive turbine stages, said wheels having intercoupled hub sections;
(b) a combined separator partition and nozzle assembly between adjoining wheels, each assembly having a pair of opposed annular partition forming sections with flanges at the inner edges, said flanges receiving and supporting seal elements around the coupled hub sections of adjoining wheels, said partition forming sections also having the peripheral edges spaced to provide an annular groove;
(c) a nozzle means surrounding the periphery of said partition forming sections, said nozzle means having spaced inner and outer rings with spaced gas guiding blades extending therebetween; and
(d) a tongue projecting inwardly from the inner ring and disposed for movement in the annular groove formed by said partition sections.

14. In a gas turbine engine:
(a) a plurality of wheels forming successive turbine stages, said wheels having intercoupled hub sections;
(b) a combined separator partition and nozzle assembly between adjoining wheels, each assembly having a pair of opposed annular partition forming sections with flanges at the inner edges, said flanges receiving and supporting seal elements around the coupled hub sections of adjoining wheels, said partition forming sections also having the peripheral edges spaced to provide an annular groove;
(c) a nozzle means surrounding the periphery of said partition forming sections, said nozzle means having spaced inner and outer rings with spaced gas guiding blades extending therebetween;
(d) a tongue projecting inwardly from the inner ring and disposed for movement in the annular groove formed by said partition sections; and
(e) resilient means engaging and centering said partition forming sections.

15. In a gas turbine engine:
(a) a plurality of wheels forming successive turbine stages, said wheels having intercoupled hub sections;
(b) a combined separator partition and nozzle assembly between adjoining wheels, each assembly having a pair of opposed annular partition forming sections with flanges at the inner edges, said flanges receiving and supporting seal elements around the coupled hub sections of adjoining wheels, said partition forming sections being shaped to provide at least one cooling fluid passage extending from the inner edge to a predetermined point spaced radially therefrom, said sections also having the peripheral edges spaced to provide an annular groove;
(c) a jet outlet tube communicating with said cooling fluid passage and projecting from one side of said separator partition toward a predetermined area on the adjacent wheel;
(d) an annular groove provided at the periphery of said separator partition;
(e) a nozzle means surrounding the periphery of said separator partition, said nozzle means having inner and outer rings spaced to provide part of a combustion gas passage;
(f) a plurality of spaced gas guiding blades integrally formed with said rings and extending therebetween; and
(g) a tongue projecting inwardly from the inner ring and disposed for relative movement in said annular groove.

References Cited by the Examiner
UNITED STATES PATENTS

| | | | |
|---|---|---|---|
| Re. 23,172 | 11/1949 | Buchi | 60—39.66 |
| 2,530,908 | 11/1950 | Ray | 253—78 |
| 2,606,741 | 8/1952 | Howard | 60—39.66 |
| 2,858,101 | 10/1958 | Alford | 253—39 |
| 2,919,104 | 12/1959 | Blyth | 253—39.1 |
| 2,919,891 | 1/1960 | Oliver | 253—39.1 |
| 2,922,278 | 1/1960 | Szydlowski | 60—39.66 |
| 2,962,256 | 11/1960 | Bishop | 253—78 |
| 2,971,334 | 2/1961 | Carlson | 60—39.66 |
| 3,033,622 | 5/1962 | Renner | 308—184 |
| 3,043,561 | 7/1962 | Scheper | 253—39.15 |
| 3,061,386 | 10/1962 | Dix et al. | 308—184 |
| 3,097,895 | 7/1963 | Matt | 308—184 |

FOREIGN PATENTS 813,399   5/1959   Great Britain.

DONLEY J. STOCKING, *Primary Examiner.*

ABRAM BLUM, SAMUEL LEVINE, *Examiners.*